United States Patent
Bucknell et al.

(10) Patent No.: US 7,801,549 B2
(45) Date of Patent: Sep. 21, 2010

(54) SCHEDULING OF UPLINK DATA TRANSMISSION USING DIFFERENT UE-IDS

(75) Inventors: Paul Bucknell, Brighton (GB); Matthew P. J. Baker, Canterbury (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 494 days.

(21) Appl. No.: 11/913,327

(22) PCT Filed: May 2, 2006

(86) PCT No.: PCT/IB2006/051379

§ 371 (c)(1),
(2), (4) Date: Nov. 1, 2007

(87) PCT Pub. No.: WO2006/117758

PCT Pub. Date: Nov. 9, 2006

(65) Prior Publication Data

US 2009/0131093 A1    May 21, 2009

(30) Foreign Application Priority Data

May 4, 2005    (GB)    ................... 0509162.4

(51) Int. Cl.
*H04B 7/005* (2006.01)
(52) U.S. Cl. ..................... 455/522; 455/69; 455/13.4; 455/63.1; 455/220; 370/318; 370/328
(58) Field of Classification Search ................. 455/522, 455/69, 67.11, 67.17, 13.4, 450, 452.2, 453, 455/420, 63.1, 71, 75, 220, 445, 509, 425, 455/512; 370/318, 328
See application file for complete search history.

(56) References Cited

U.S. PATENT DOCUMENTS 6,721,368 B1 *    4/2004    Younis et al. ............... 375/295

(Continued)

FOREIGN PATENT DOCUMENTS

EP    1655909 A1    5/2006

(Continued)

OTHER PUBLICATIONS

Shin Yokohkama; "EDCH Identity Priority", Nov. 15-19, 2004, Siemens, XP002367157.

(Continued)

*Primary Examiner*—Tan Trinh

(57) ABSTRACT

A radio terminal adjusts its data transmit power in response to received power control commands which specify a maximum transmit power level. The commands may be addressed to an individual radio terminal by means of a first address, or addressed to a group of radio terminals by means of a second address. In order that the data transmit power of an individual radio terminal is not disrupted by the commands addressed to a group, the radio terminal operates in two states. In the first state the radio terminal responds to commands comprising the first address and does not respond to commands comprising the second address. In the second state the radio terminal responds to commands comprising the second address. The radio terminal transfers from the first state to the second state in response to receiving a command comprising the first address and a predetermined value. On entering the second state the transmit power is set in accordance with the last-received command comprising the second address, thereby avoiding the need for transmission of a further command comprising the second address before transmission in the second state can proceed. Alternatively, or additionally, transmission rate may be controlled in the same manner.

4 Claims, 5 Drawing Sheets

U.S. PATENT DOCUMENTS

Figure 1:
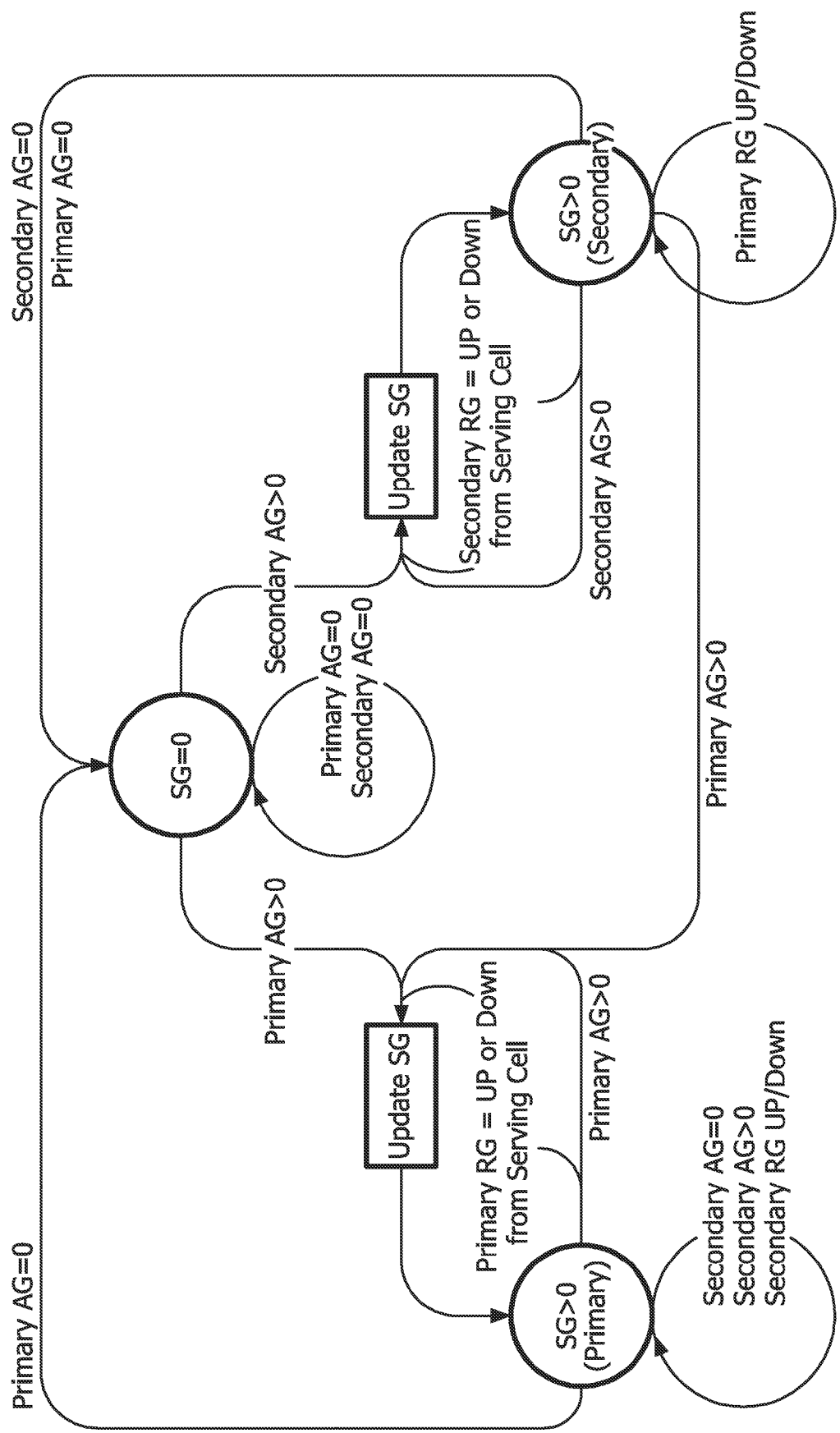

| | | | |
|---|---|---|---|
| 7,123,596 B2 * | 10/2006 | Fukui | 370/329 |
| 2004/0203981 A1 * | 10/2004 | Budka et al. | 455/522 |
| 2006/0114877 A1 * | 6/2006 | Heo et al. | 370/342 |
| 2008/0123585 A1 * | 5/2008 | Granzow et al. | 370/320 |

FOREIGN PATENT DOCUMENTS

| | | |
|---|---|---|
| WO | 2006051256 A1 | 5/2006 |

OTHER PUBLICATIONS

"E-DCH Scheduling—Way Forward", Prague, Czech Republic, Aug. 16-20, 2004, Ericsson, XP002367153.

"EUL Scheduling: Signallimg Support", Seoul Korea, Sep. 20-24, 2004, Samsung, XP002367154.

"Node B Controlled Scheduling", Prague, Czech Republic, Aug. 16-20, 2004, Samsung, XP002367155.

* cited by examiner

SCHEDULING OF UPLINK DATA TRANSMISSION USING DIFFERENT UE-IDS

The invention relates to a method of operating a radio terminal and has application in, particularly but not exclusively, mobile communication terminals and systems such as the Universal Mobile Telecommunications System (UMTS).

It is known for a mobile communication network to transmit to a mobile terminal that requires to transmit data a grant message that gives permission for the mobile terminal to transmit its data. The grant message may be transmitted in response to a request message transmitted by the mobile terminal. The grant message may include an indication of a maximum permitted transmit power level or a maximum permitted transmission rate at which the mobile terminal may transmit. In UMTS such a grant message is termed an Absolute Grant. The mobile terminal may use the indication to select its initial transmit power level and bit rate.

A mobile terminal that requires to transmit many data packets will require many grant messages to be transmitted, and the maximum permitted transmit power level may vary from grant to grant, due to, for example, varying propagation conditions and varying load in the network. In order to reduce the amount of grant signalling, the network may transmit more concise grant messages that, instead of indicating a maximum permitted transmit power level or maximum permitted transmission rate, command the mobile terminal to increase or decrease its maximum permitted transmit power level or maximum permitted transmission rate relative to a previously indicated maximum, if appropriate as modified by any previously transmitted concise grant messages. In UMTS such a concise grant message is termed a Relative Grant. An Absolute Grant message may require, for example, 5 bits to represent a maximum permitted power level, whereas a Relative Grant message may require only a single bit to indicate an increase or decrease in maximum permitted power level.

An additional mechanism for reducing the amount of grant signalling is to address the grant messages to a group of mobile stations requiring to transmit data, rather than to address a different grant message to each mobile station. Both Absolute Grants (AG) and Relative Grants (RG) may be addressed to a group. The current UMTS scheme specifies that a mobile terminal, referred to as a user equipment (UE), listens to both a primary and secondary identity, where the primary identity is typically associated with a single UE while the secondary identity may be associated with a group of UEs. An individual UE is not necessarily aware of how many other UEs share one of its identities. (The terms "address" and "identity" are used interchangeably in this specification).

Transmitting grants to a group of UEs using a secondary identity reduces the amount of grant signalling required. However, transmitting grants to a single UE allows better control of that UE's transmitted rate. It is necessary to control which grants the UE should act upon at any given time, and in switching from one state to another data may be delayed.

FIG. 1 shows the operation of a scheduling scheme in response to received Absolute and Relative grants using a primary and a secondary identity. The secondary identity is used to enable a group of UEs to have a small, regularly-updated "in advance" grant to enable fast request-free transmission of high-priority data. The diagram shows three states:

1. SG=0—the serving grant is set at zero
2. SG>0 (Primary)—the absolute grant was received with the UE's primary identity
3. SG>0 (Secondary)—the absolute grant was received with the UE's secondary identity A number of restrictions are evident. If the UE is currently reacting on primary AGs and the scheduler in a base station wants to switch the UE to react to secondary AGs, the scheduler must send a primary AG of zero, then the secondary AG is received and the UE starts reacting to secondary AG commands. A further problem is that relative grants are in dB step sizes (or a ratio of the current power), which means that the actual grant cannot ever reach zero. This means that if the UE is listening to either its primary or secondary identity and it continues to receive multiple RG down commands, it can become "trapped" in a low grant state, waiting for multiple RG up commands or a new AG.

It is an object of the present invention to improve the control of a UE's transmission rate.

According to a first aspect of the invention there is provided a method of operating a radio terminal having an adjustable transmit power level for the transmission of data, comprising: adopting a first state in which the maximum permitted transmit power level is adjusted in response to first commands received comprising a first address and is not adjusted in response to second commands received comprising a second address; adopting a second state in which the maximum permitted transmit power level is adjusted in response to the second commands received comprising the second address; and transferring from the first state to the second state in response to receiving a first command having a predetermined value and comprising the first address and setting the initial maximum permitted transmit power level in the second state in accordance with the last-received second command comprising the second address.

According to a second aspect of the invention there is provided a method of operating a radio terminal having an adjustable transmission rate for the transmission of data, comprising: adopting a first state in which the maximum permitted transmission rate is adjusted in response to first commands received comprising a first address and is not adjusted in response to second commands received comprising a second address; adopting a second state in which the maximum permitted transmission rate is adjusted in response to the second commands received comprising the second address; and transferring from the first state to the second state in response to receiving a first command having a predetermined value and comprising the first address and setting the initial maximum permitted transmission rate in the second state in accordance with the last-received second command comprising the one of the first commands comprising the first address.

Optionally, while in the second state, the radio terminal transfers to the first state in response to receiving one of the first commands comprising the first address.

The invention will now be described, by way of example only, with reference to the accompanying drawings in which:

FIG. 1 is a state transition diagram for a known method of operating a radio terminal; and FIGS. 2-5 are state transition diagrams of embodiments of the present invention.

In one embodiment, the indication to use a lower serving grant comprises a "down" relative grant, or an absolute grant associated with a primary identity, which causes the serving grant to fall below a predetermined threshold.

Figure 2:
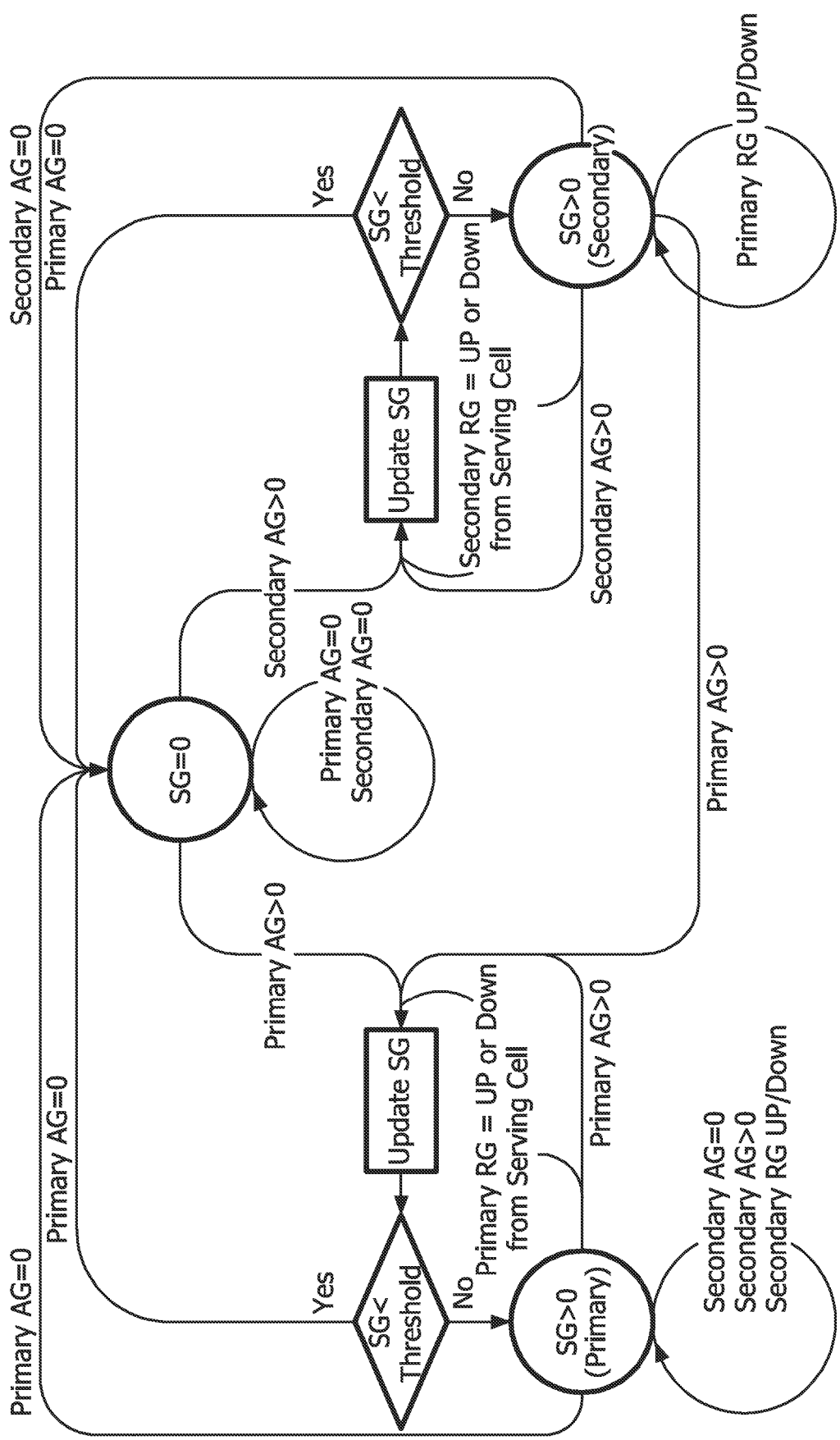

FIG. 2 shows the same as FIG. 1 but with the addition to the diagram of the threshold decision block after the update SG block in both Primary and Secondary modes.

If the resulting SG is below a given threshold value then the UE moves to the SG=0 state. This has the advantage that only one "up" RG is needed to bring the UE's serving grant back to a useful level to transmit data.

Figure 3:
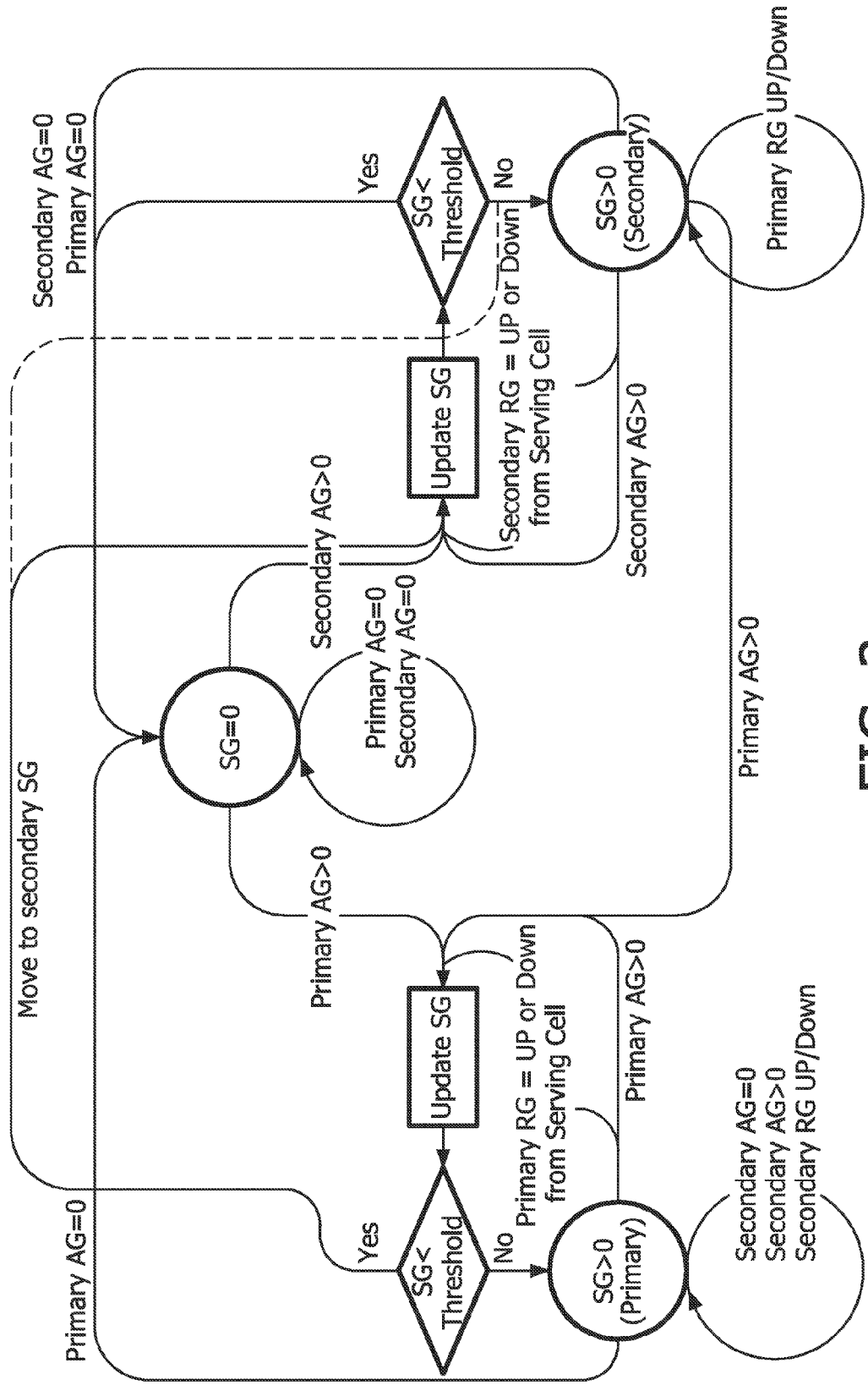

An alternative version of this embodiment involves the UE moving directly to reacting to scheduling grants associated with a secondary identity. This can have the effect of switching the UE to a low, periodically-updated continuous grant, which could reduce data flow interruption. FIG. 3 shows this version of the embodiment, with the Yes branch from the "SG<threshold box" being directed directly to updating the SG for the Secondary SG state or alternatively (broken line) directly to the Secondary "SG>0" state if the existing SG continues to be used. The threshold value could be the same as an AG associated with the secondary identity, or could be predetermined. The "update SG" could either be done with the last-received secondary AG, or with some pre-defined (or signalled) default value for secondary AG. Thus the need for transmitting a further command comprising the second address before transmission in the second state can proceed is avoided.

Figure 4:
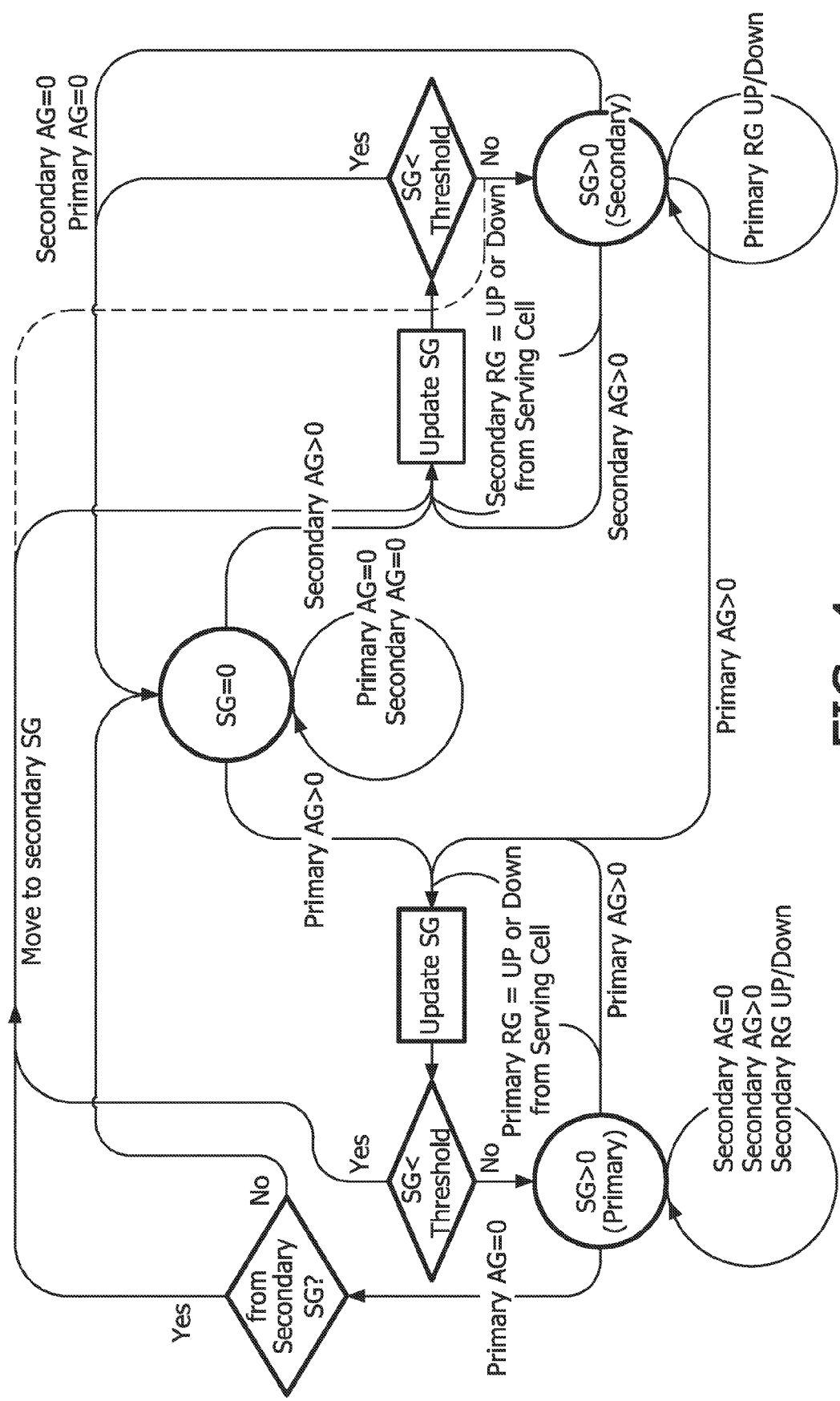

A third embodiment, shown in FIG. 4, involves using a particular value of grant to indicate that the UE should switch to obeying grants associated with a different identity. In FIG. 4, this is achieved when an absolute grant of "0" is received associated with a primary identity. Instead of setting the serving grant to 0, the UE moves directly from reacting to grants associated with the primary identity, to reacting to grants associated with the secondary identity.

Figure 5:
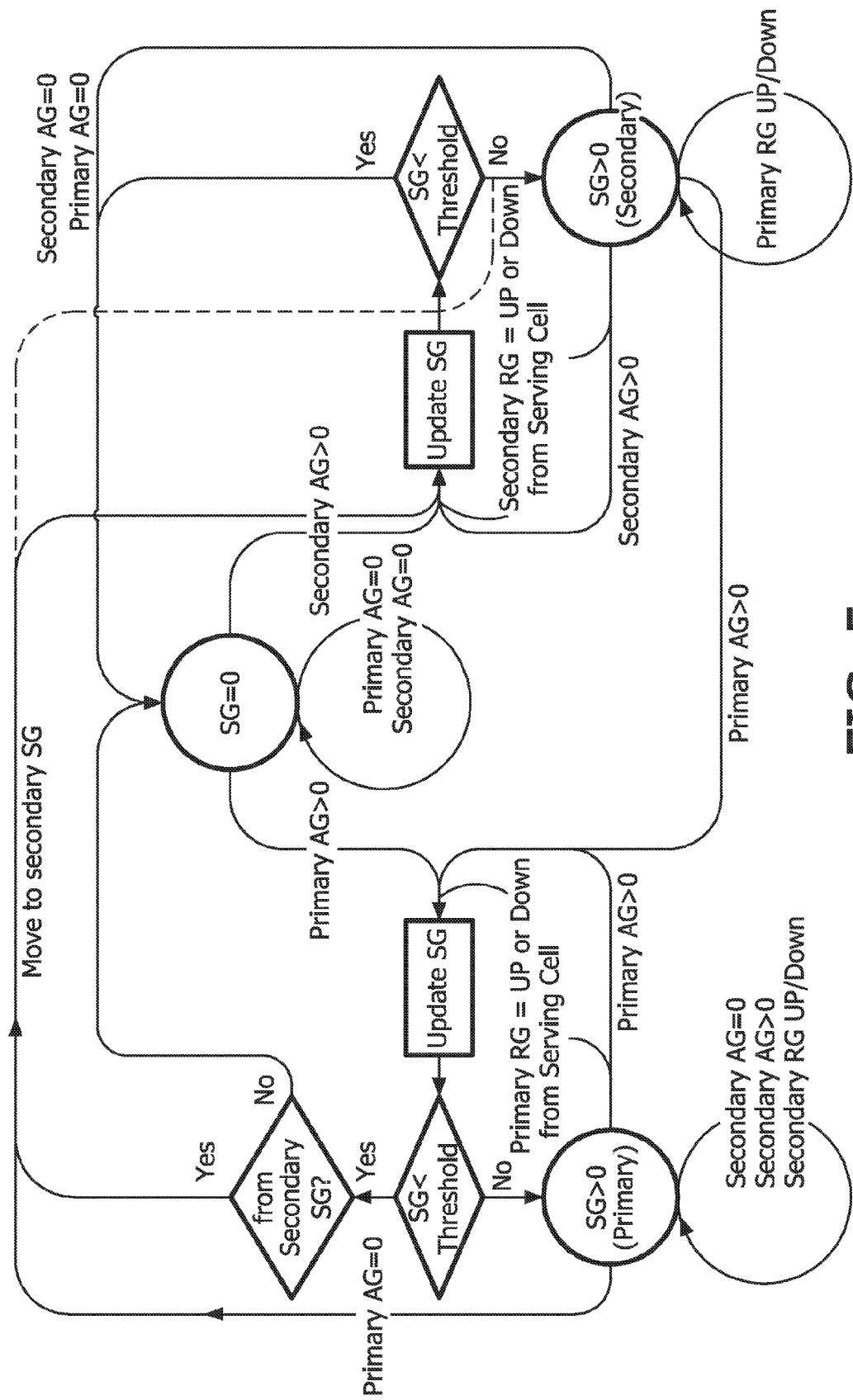

In a variation of this embodiment, also shown in FIG. 5, this direct move could be conditional on having previously been controlled by grants associated with the secondary identity, as shown by the decision box "from secondary?".

This has the advantage of better predicting the likely transmission rate requirements of the UE. For example, if the UE was originally part of a group allocated a low continuous rate, and was then granted its own higher rate using its primary identity, then when its own grant was cancelled (e.g. at the end of a data burst) the UE would be more likely to want to switch back to its previous continuous low rate than to stop transmitting altogether (e.g. if another low-rate background transmission was ongoing). (The UE could still be stopped from transmitting altogether if desired, simply by sending it a second AG=0 with the primary identity.) Conversely, if the UE had previously had no grant before being granted its own higher rate using its primary identity, then when its own grant was cancelled the best assumption is to switch back to a zero SG.

Optionally the UE could interpret relative grants differently depending on whether the serving grant is currently zero. For example, the first RG "up" received after setting the SG to zero as a result of the SG falling below the threshold could be interpreted as an instruction to restore the SG to the threshold level (or to its most recently-held value before it dropped below the threshold level), whereas subsequent RG "up"s would be interpreted as a ratio (or dB increase) in the conventional manner.

According to a third aspect of the invention there is provided a method of operating a radio terminal having an adjustable transmit power level, comprising: in response to receiving a first signal comprising a first address and an indication of a first maximum permitted power level, setting the transmit power level in compliance with the indicated first maximum permitted power level; in response to receiving a second signal comprising the first address, increasing the transmit power level; in response to receiving a third signal comprising the first address, decreasing the transmit power level; in response to receiving a fourth signal comprising a second address and an indication of a second maximum permitted power level, setting the transmit power level in compliance with the indicated second maximum permitted power level; in response to receiving a fifth signal comprising the second address, increasing the transmit power level; in response to receiving a sixth signal comprising the second address, decreasing the transmit power level; subject to: adopting a first state in which the transmit power level is adjusted in response to receiving the first, second or third signals and is not adjusted in response to receiving the fourth, fifth or sixth signals; adopting a second state in which the transmit power level is adjusted in response to receiving the fourth, fifth or sixth signal; and transferring from the first state to the second state in response to receiving the third signal that results in the transmit power level falling below a threshold value, or in response to receiving the first signal if the indicated maximum permitted power level is a predetermined value or is within a defined range.

Optionally, the method according to the third aspect of the invention further comprises, while in the second state, adjusting the transmit power level in response to receiving the first signal.

Optionally, the method according to the third aspect of the invention further comprises, while in the second state, transferring to the first state in response to receiving the second signal.

Optionally, the method according to the third aspect of the invention further comprises adjusting the transmit power level in response to receiving the second signal while in the second state.

Optionally, in the method according to the third aspect of the invention the threshold value is predetermined or indicated in a received signal.

Optionally, in the method according to the third aspect of the invention the defined range is one of: less than a predetermined threshold; less than a threshold indicated by the fourth signal; greater than a threshold; greater than a threshold indicated by the fourth signal.

Optionally, in the method according to the third aspect of the invention increasing and decreasing the transmit power level comprises respectively increasing and decreasing the transmit power level by a ratio.

According to a fourth aspect of the invention there is provided a method of operating a radio terminal having an adjustable transmission rate, comprising: in response to receiving a first signal comprising a first address and an indication of a first maximum permitted power level, setting the transmission rate in compliance with the indicated first maximum permitted transmission rate; in response to receiving a second signal comprising the first address, increasing the transmission rate; in response to receiving a third signal comprising the first address, decreasing the transmission rate; in response to receiving a fourth signal comprising a second address and an indication of a second maximum permitted transmission rate, setting the transmission rate in compliance with the indicated second maximum permitted transmission rate; in response to receiving a fifth signal comprising the second address, increasing the transmission rate; in response to receiving a sixth signal comprising the second address, decreasing the transmission rate; subject to: adopting a first state in which the transmission rate is adjusted in response to receiving the first, second or third signals and is not adjusted in response to receiving the fourth, fifth or sixth signals; adopting a second state in which the transmission rate is adjusted in response to receiving the fourth, fifth or sixth signal; and transferring from the first state to the second state in response to receiving the third signal that results in the transmission rate falling below a threshold value, or in response to receiving the first signal if the indicated maximum permitted transmission rate is a predetermined value or is within a defined range.

Optionally, the method according to the fourth aspect of the invention further comprises, while in the second state, adjusting the transmission rate in response to receiving the first signal.

Optionally, the method according to the fourth aspect of the invention further comprises, while in the second state, transferring to the first state in response to receiving the second signal.

Optionally, the method according to the fourth aspect of the invention further comprises adjusting the transmission rate in response to receiving the second signal while in the second state.

Optionally, in the method according to the fourth aspect of the invention the threshold value is predetermined or indicated in a received signal.

Optionally, in the method according to the fourth aspect of the invention the defined range is one of: less than a predetermined threshold; less than a threshold indicated by the fourth signal; greater than a threshold; greater than a threshold indicated by the fourth signal.

Optionally, in the method according to the fourth aspect of the invention the increasing and decreasing the transmission rate comprises respectively increasing and decreasing the transmission rate by a ratio.

The invention provides a scheme where the existing grant messages may take special meanings in some circumstances, so as to change the mode in which the UE responds to scheduling grants.

In general, an indication to use a lower serving grant than a particular threshold causes the UE to change the mode in which it responds to scheduling grants.

A "down" RG, or a particular combination of a predetermined value of an AG and a predetermined identity, can cause the UE to change state if certain conditions are met.

The current serving grant (SG) is compared to a threshold and when this threshold is reached the grant is set to zero. An advantage of this is that that a UE can then be moved to listening to it's secondary identity and be allowed to transmit without having to be given a new primary AG. This reduces the amount of signalling required to control the transmission of the UEs in the cell.

According to a fifth aspect of the invention there is provided a method of operating a radio terminal having an adjustable transmit power level, comprising: in response to receiving a first signal, increasing a transmit power level of a data channel; in response to receiving a second signal, decreasing the transmit power level of the data channel; and in response to receiving the second signal that results in the transmit power level falling below a threshold value, reducing the transmit power level to zero for the data channel.

According to a sixth aspect of the invention there is provided a method of operating a radio terminal having an adjustable transmission rate, comprising: in response to receiving a first signal, increasing a transmission rate of a data channel; in response to receiving a second signal, decreasing the transmission rate of the data channel; and in response to receiving the second signal that results in the transmission rate falling below a threshold value, reducing the transmission rate to zero for the data channel.

By reducing the transmit power level to zero, the radio terminal conserves power, rather than transmitting at a power level that is insufficient for reliable communication. By reducing the transmission rate to zero, the radio terminal conserves power, rather than transmitting at a transmission rate that is insufficient for an acceptable quality of service.

In the present specification and claims the word "a" or "an" preceding an element does not exclude the presence of a plurality of such elements. Further, the word "comprising" does not exclude the presence of other elements or steps than those listed.

The invention claimed is:

1. A method of operating a radio terminal having an adjustable transmit power level for the transmission of data, comprising:
    adopting a first state in which the maximum permitted transmit power level is adjusted in response to first commands received comprising a first address and is not adjusted in response to second commands received comprising a second address;
    adopting a second state in which the maximum permitted transmit power level is adjusted in response to the second commands received comprising the second address; and
    transferring from the first state to the second state in response to receiving a first command having a predetermined value and comprising the first address and setting the initial maximum permitted transmit power level in the second state in accordance with the last-received second command comprising the second address.

2. A method as claimed in claim 1, further comprising, while in the second state, transferring to the first state in response to receiving one of the first commands comprising the first address.

3. A method of operating a radio terminal having an adjustable transmission rate for the transmission of data, comprising:
    adopting a first state in which the maximum permitted transmission rate is adjusted in response to first commands received comprising a first address and is not adjusted in response to second commands received comprising a second address;
    adopting a second state in which the maximum permitted transmission rate is adjusted in response to the second commands received comprising the second address; and
    transferring from the first state to the second state in response to receiving a first command having a predetermined value and comprising the first address and setting the initial maximum permitted transmission rate in the second state in accordance with the last-received second command comprising the second address.

4. A method as claimed in claim 3, further comprising, while in the second state, transferring to the first state in response to receiving one of the first commands comprising the first address.

* * * * *